(12) United States Patent
Jeon et al.

(10) Patent No.: US 10,400,757 B2
(45) Date of Patent: Sep. 3, 2019

(54) LINEAR COMPRESSOR

(71) Applicant: LG ELECTRONICS INC., Seoul (KR)

(72) Inventors: Gyeoungjin Jeon, Seoul (KR); Sunghyun Ki, Seoul (KR); Eonpyo Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 194 days.

(21) Appl. No.: 15/393,047

(22) Filed: Dec. 28, 2016

(65) Prior Publication Data

US 2017/0204841 A1 Jul. 20, 2017

(30) Foreign Application Priority Data

Jan. 19, 2016 (KR) ........................ 10-2016-0006362

(51) Int. Cl.
  *F04B 39/00* (2006.01)
  *F04B 39/12* (2006.01)
  *F04B 35/04* (2006.01)
  *F04B 39/10* (2006.01)

(52) U.S. Cl.
  CPC ........ *F04B 39/0044* (2013.01); *F04B 35/045* (2013.01); *F04B 39/10* (2013.01); *F04B 39/102* (2013.01); *F04B 39/121* (2013.01); *F04B 39/125* (2013.01); *F04B 39/127* (2013.01); *F04B 39/0005* (2013.01)

(58) Field of Classification Search
  CPC .... F04B 39/10; F04B 39/102; F04B 39/0044; F04B 39/125; F04B 39/121; F04B 39/045; F04B 39/127; F04B 39/005

USPC .................................. 417/570, 417; 137/538
See application file for complete search history.

(56) References Cited

U.S. PATENT DOCUMENTS

| | | | |
|---|---|---|---|
| 668,405 A * | 2/1901 | Holden | |
| 2,710,023 A * | 6/1955 | Blackford | F16K 15/028 137/515.5 |
| 5,346,373 A | 9/1994 | Riffe | |
| 5,546,981 A * | 8/1996 | Li | F16K 15/028 137/493.3 |
| 6,902,381 B2 * | 6/2005 | Hur | F04B 39/125 417/570 |

(Continued)

FOREIGN PATENT DOCUMENTS

| CN | 1441878 A | 9/2003 |
|---|---|---|
| CN | 1477309 A | 2/2004 |

(Continued)

*Primary Examiner* — Charles G Freay
(74) *Attorney, Agent, or Firm* — Dentons US LLP

(57) ABSTRACT

A linear compressor includes a cylinder that defines a compression space for a refrigerant, a frame that fixes the cylinder to a shell, a piston that axially reciprocates in an interior of the cylinder, a discharge valve that is provided in front of the cylinder to selectively discharge the refrigerator compressed in the compression space for the refrigerant, a discharge cover that is coupled to the frame and has a discharge space for the refrigerant discharged through the discharge valve, a valve spring that provides an axial resilient force to the discharge valve while supporting the discharge valve, and a valve support device that is coupled to the valve spring and supported by the frame to deliver vibration generated by the discharge valve to the frame.

12 Claims, 8 Drawing Sheets

(56) References Cited

U.S. PATENT DOCUMENTS

| | | | |
|---|---|---|---|
| 2005/0175473 A1* | 8/2005 | Park | F04B 35/045 |
| | | | 417/363 |
| 2005/0175474 A1 | 8/2005 | Lee et al. | |
| 2006/0060195 A1 | 3/2006 | Noh et al. | |
| 2009/0220365 A1 | 9/2009 | Kang et al. | |
| 2015/0004030 A1 | 1/2015 | Jeong | |
| 2015/0226191 A1* | 8/2015 | Ki | F04B 49/20 |
| | | | 417/53 |

FOREIGN PATENT DOCUMENTS

| | | | |
|---|---|---|---|
| CN | 1538063 A | | 10/2004 |
| CN | 1637282 A | | 7/2005 |
| CN | 101205887 A | | 6/2008 |
| GB | 2296961 | * | 7/1996 |
| JP | 2016008610 A | | 1/2016 |
| KR | 10-0323526 B1 | | 2/2002 |
| KR | 10-0600761 A | | 7/2006 |
| KR | 10-2010-0046599 A | | 5/2010 |
| KR | 10-1454549 B1 | | 10/2014 |
| KR | 10-1484539 B1 | | 1/2015 |
| KR | 10-2016-0001056 A | | 1/2016 |
| KR | 10-2016-0005517 A | | 1/2016 |
| WO | 2004/081378 A2 | | 9/2004 |

\* cited by examiner

LINEAR COMPRESSOR

CROSS-REFERENCE TO RELATED APPLICATION

The application claims priority under 35 U.S.C. § 119 and 35 U.S.C. § 365 to Korean Patent Application No. 10-2016-0006362, filed in Korea on Jan. 19, 2016, whose entire disclosure is hereby incorporated by reference.

BACKGROUND

The present disclosure relates to a linear compressor.

A cooling system is a system for generating cooling air by circulating a refrigerant, and repeatedly performs a process of compressing, condensing, expanding, and evaporating a refrigerant. To achieve this, the cooling system includes a compressor, a condenser, an expansion unit, and an evaporator. Further, the cooling system may be installed in a refrigerator or an air conditioner as a home appliance.

In general, the compressor is a machine that increases a pressure by receiving power from a power generating device such as an electric motor or a turbine and compressing air, a refrigerant, or other various working gases, and is widely used in home appliances or various industries.

Such compressors may be classified into a reciprocating compressor that defines a compression space into and from which a working gas is suctioned and discharged, between a piston and a cylinder, to compress a refrigerant while the piston reciprocates in the interior of the cylinder, a rotary compressor that defines a compression space into and from which a working gas is suctioned and discharged, between an eccentrically rotating roller and a cylinder, to compress a refrigerant while the roller eccentrically rotates along an inner wall of the cylinder, and a scroll type compressor that defines a compression space into and from which a working gas is suctioned and discharged, between an orbiting scroll and a fixed scroll, to compress a refrigerant while the orbiting scroll rotates along the fixed scroll.

In recent years, among the reciprocating compressors, liner compressors that is directly connected to a driving motor, by which a piston is linearly reciprocated, to improve a compression efficiency without a mechanical loss due to conversion of motions while having a simple structure have been widely developed.

In general, a linear compressor is configured to suction, compress, and discharge a refrigerant while a piston is linearly reciprocated within a cylinder by a linear motor, in an airtight interior of a shell.

In the linear motor, a permanent magnet is situated between an inner stator and an outer stator, and the permanent magnet is linearly reciprocated by a mutual electromagnetic force between the permanent magnet and an inner (or outer) stator. Further, as the permanent magnet is driven while being connected to the piston, a refrigerant is suctioned, compressed, and discharged while the piston is linearly reciprocated within the cylinder.

According to a conventional linear compressor, such as disclosed in Korean Patent No. 10-1454549, titled "Linear Compressor," a discharge valve is directly supported by a discharge cover by using a coil spring. If the linear compressor is driven, a compressed refrigerant gas passes through a discharge cover and a discharge muffler via an opened discharge valve, and is discharged to the outside of the compressor via a loop pipe.

The discharge valve may vibrate due to a pulsation of the generated refrigerant gas, the vibration is delivered to the discharge cover through a coil spring and is delivered to a shell through a support device that supports the discharge cover, so that the whole compressor vibrates and nose occurs accordingly.

SUMMARY

Embodiments provide a linear compressor for reducing vibration or noise generated on a discharge side of a refrigerant.

In accordance with an aspect of the present disclosure, there is provided a linear compressor including a cylinder that defines a compression space for a refrigerant, a frame that fixes the cylinder to a shell, a piston that axially reciprocates in an interior of the cylinder, a discharge valve that is provided in front of the cylinder to selectively discharge the refrigerator compressed in the compression space for the refrigerant, a discharge cover that is coupled to the frame and has a discharge space for the refrigerant discharged through the discharge valve, a valve spring that provides an axial resilient force to the discharge valve while supporting the discharge valve, and a valve support device that is coupled to the valve spring and supported by the frame to deliver vibration generated by the discharge valve to the frame.

The valve support device may include a support body that is positioned on one surface of the discharge cover, and a cylinder support part that extends from the support body and is coupled to the cylinder or the frame.

A plurality of cylinder support parts may be provided, and the plurality of cylinder support parts may be arranged on an outer peripheral surface of the support body to be spaced apart from each other.

The cylinder support part may include a first coupling part through which a coupling member passes.

The linear compressor may further include a second coupling part which is formed in the cylinder and through which the coupling member passes, and a third coupling part which is formed in the frame and to which the coupling member is coupled.

The valve spring may include a plate spring.

The valve support device may include a spring coupling part to which the valve spring is coupled, a cylinder coupling part that extends rearwards from the spring coupling part to be coupled to the cylinder, and a frame support part that extends radially from the spring coupling part to be supported by the frame.

The cylinder may include a cylinder body that accommodates the piston, and a cylinder flange which is provided in front of the cylinder body and into which the cylinder coupling part is inserted.

The discharge cover may include a cover body that is arranged in front of the valve support device to face the valve support device, and a valve stopper that protrudes rearwards from the cover body to restrict an opened degree of the valve spring.

The cover body may be spaced apart from a front surface of the valve support device by a set distance (S) to restrict delivery of vibration from the discharge valve to the cover body.

The valve spring may include a coil spring.

In accordance with another aspect of the present disclosure, there is provided a linear compressor including a cylinder that defines a compression space for a refrigerant, a frame that fixes the cylinder to a shell, a discharge valve that is provided in front of the cylinder to selectively discharge the refrigerator compressed in the compression space for the refrigerant, a discharge cover that is coupled to the frame and has a discharge space for the refrigerant discharged through the discharge valve, a valve spring that provides an axial resilient force to the discharge valve while supporting the discharge valve, and a valve support apparatus that is supported by the frame, wherein the valve support device includes a spring coupling part which is coupled to the valve spring, and a cylinder coupling part that extends from the spring coupling part to be coupled to the cylinder.

The linear compressor may further include a coupling member that is coupled to the frame, and the coupling member may pass through the cylinder support part and the cylinder.

The discharge cover may include a cover body that is arranged in front of the valve support device to face the valve support device, and a valve stopper that protrudes from the cover body to restrict an opened degree of the valve spring.

The cover body may be spaced apart from the spring coupling part by a set distance (S) to restrict delivery of vibration from the discharge valve to the cover body.

DETAILED DESCRIPTION OF THE EMBODIMENTS

Hereinafter, detailed embodiments of the present disclosure will be described in detail with reference to the accompanying drawings. Meanwhile, the spirit of the present disclosure is not limited to the embodiments, and those skilled in the art who understand the spirit of the present disclosure may understand other embodiments easily within the same spirit range.

Figure 1:
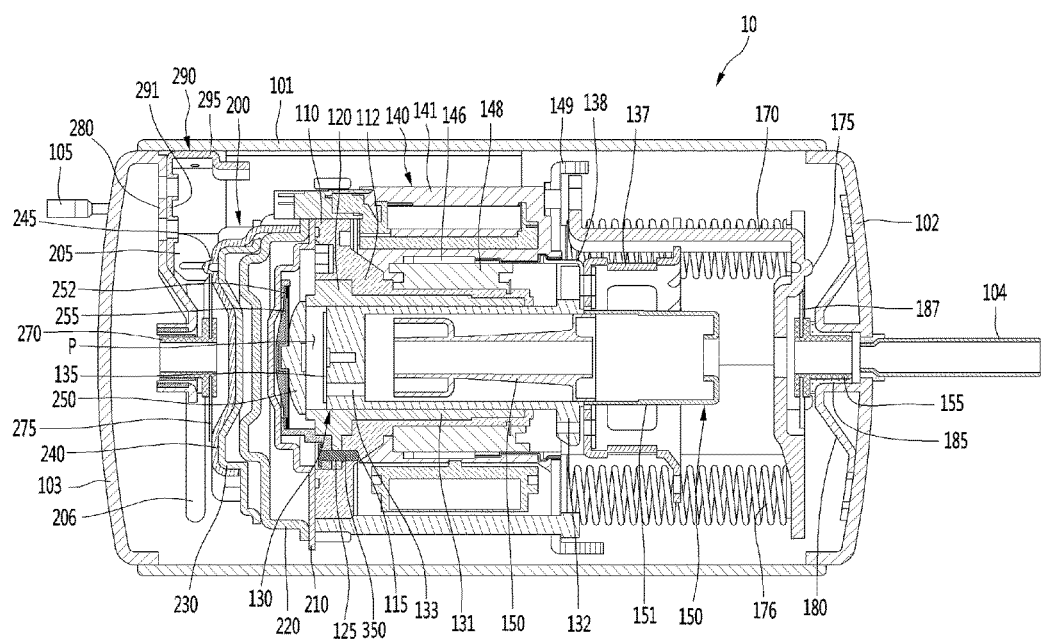
FIG. 1 is a sectional view illustrating a configuration of a linear compressor according to a first embodiment of the present disclosure.

FIG. 1 is a sectional view illustrating a configuration of a linear compressor according to a first embodiment of the present disclosure.

Referring to FIG. 1, the linear compressor 10 according to the first embodiment of the present disclosure includes a substantially cylindrical shell 101, a first shell cover 102 that is coupled to one side of the shell 101, and a second shell cover 103 that is coupled to an opposite side of the shell 101.

As an example, the linear compressor 10 is laid transversely, and the first shell cover 102 may be coupled to a right side of the shell 101 and the second shell cover 103 may be coupled to a left side of the shell 101 in the drawings. In a wide sense, the first shell cover 102 and the second shell cover 103 may be understood as a configuration of the shell 101.

The linear compressor 10 includes a cylinder 120 that is provided in the interior of the shell 101, a piston 130 that linearly reciprocates in the interior of the cylinder 120, and a motor assembly 140 as a linear motor that gives driving power to the piston 130.

If the motor assembly 140 is driven, the piston 130 may axially reciprocate.

In detail, the linear compressor 10 includes a suction part 104 through which a refrigerant is introduced, and a discharge part 105 through which the refrigerant compressed in the interior of the cylinder 120 is discharged. The suction part 104 may be coupled to the first shell cover 102, and the discharge part 105 may be coupled to the second shell cover 103.

The refrigerator suctioned through the suction unit 104 flows into the piston 130 via a suction muffler 150. While the refrigerator passes through the suction muffler 150, noise may be reduced. The suction muffler 150 is a combination of a first muffler 151 and a second muffler 153. At least a portion of the suction muffler 150 is situated in the interior of the piston 130.

The piston 130 includes a substantially cylindrical piston body 131, and a piston flange part 132 that extends radially from the piston body 131. The piston body 131 may reciprocate in the interior of the cylinder 120, and the piston flange part 132 may reciprocate outside the cylinder 120.

The cylinder 120 is configured to accommodate at least a portion of the suction muffler 150, and at least a portion of the piston 130.

A compression space P in which the refrigerant is compressed by the piston 130 is formed in the interior of the cylinder 120. Further, a suction hole 133 through which the refrigerant is introduced into the compression space P is formed in front of the piston 130, and a suction valve 135 that selectively opens the suction hole 133 is provided in front of the suction hole 133. A coupling hole, to which a coupling member is coupled, is formed at a substantially central portion of the suction valve 135.

A discharge cover 200 that defines a discharge space or a discharge passage for the refrigerant discharged from the compression space P, and a discharge valve assembly that is coupled to the discharge cover 200 to selectively discharge the refrigerant compressed in the compression space P are provided in front of the compression space P.

The discharge valve assembly includes a discharge valve 250 that is opened when a pressure of the compression space P is not less than a discharge pressure, to introduce the refrigerant into a discharge space of the discharge cover 200, and a valve spring 252 that is provided between the discharge valve 250 and the discharge cover 200 to provide an axial resilient force. For example, the valve spring 252 may include a leaf spring.

The discharge valve 250 is coupled to the valve spring 252, and a rear side or a rear surface of the discharge valve 250 is supported by a front surface of the cylinder 120. For example, the valve spring 252 may include a plate spring.

The discharge valve assembly further includes a valve support device 300 that supports the valve spring 250 or the discharge valve 250. The valve support device 300 may be seated on an inner surface of the first cover 210 of the discharge cover 200. A configuration of the valve support device 300 will be described later.

The compression space P is understood as a space that is defined between the suction valve 135 and the discharge valve 250. Further, the suction valve 135 may be formed on one side of the compression space P, and the discharge valve 250 may be provided on an opposite side of the compression space P, that is, an opposite side of the suction valve 135.

Meanwhile, the axial direction may be understood as a direction in which the piston 130 reciprocates, that is, the transverse direction of FIG. 1. Further, a direction of the axial direction, which faces from the suction part 104 towards the discharge part 105, that is, a direction in which the refrigerant flows is defined as a front side, and an opposite direction thereof is defined as a rear side.

Meanwhile, the radiation direction is a direction that is perpendicular to a direction in which the piston 130 reciprocates, and may be understood as the longitudinal direction of FIG. 1.

If the pressure of the compression space P is lower than a discharge pressure and not more than a suction pressure while the piston 130 is linearly reciprocates in the interior of the cylinder 120, the suction valve 135 is opened so that the refrigerant is suctioned into the compression space P. Meanwhile, if the pressure of the compression space P is not less than the suction pressure, the refrigerant in the compression space P is compressed while the suction valve 135 is closed.

Meanwhile, if the pressure of the compression space P is not less than the discharge pressure, the discharge valve 250 is opened while the valve spring 252 is deformed forwards, and the refrigerant is discharged to the compression space P to be discharged to the discharge space of the discharge cover 200. If the refrigerant is completely discharged, the valve spring 252 provides a restoring force to the discharge valve 250 to close the discharge valve 250.

The refrigerant that flows in the discharge space of the discharge cover 200 is discharged from the discharge cover 200 through a discharge pipe 205, and is introduced into a discharge hose 206. The discharge hose 206 is coupled to the discharge pipe 205 and extends to the discharge part 105, and guides the compressed refrigerant to the discharge part 105. For example, the discharge hose 206 extends roundly while having a shape that is wound in a specific direction, and is coupled to the discharge part 105.

A plurality of covers are provided in the discharge cover 200. The plurality of covers include a first cover 210, a second cover 220, a third cover 230, and a fourth cover 240. The first cover 210, the second cover 220, the third cover 230, and the fourth cover 240 may be sequentially arranged from the discharge valve 250.

A first discharge passage through which the compressed refrigerant discharged through the opened discharge valve 250 is provided between the first cover 210 and the second cover 220, and a second discharge passage through which the refrigerant that passed through the first discharge passage flows are provided in a space between the second cover 220 and the third cover 230.

The discharge pipe 205 is coupled to the third cover 230, and the refrigerant that passed through the second discharge passage may be discharged to the discharge pipe 205.

The fourth cover 240 is arranged in front of the third cover 230 to support the third cover 230. The fourth cover 240 may be titled "a support cover".

A resilient cover member 275 is coupled to the fourth cover 240. The fourth cover 240 includes a first cover boss 245 that is coupled to the resilient cover member 275. For example, the first cover boss 245 may be inserted into the resilient cover member 275. Further, a cover coupling part 270 is coupled to the resilient cover member 275.

The linear compressor 10 further include a discharge side support member 280 that supports the cover coupling part 270 by using a magnetic field. The discharge side support member 280 surrounds at least a portion of the cover coupling part 270, and may support the cover coupling part 270 by using a magnetic force while being spaced apart from an outer peripheral surface of the cover coupling part 270.

The discharge side support member 280 may extend radially from the cover coupling part 270 to be coupled to the second shell cover 103.

The linear compressor 10 further includes a reinforcing member that is coupled to the discharge side support member 280. For example, the discharge side support member 280 and the reinforcing member 290 may be coupled to each other by a coupling member.

The reinforcing member 290 is coupled to the discharge side support member 280 to extend towards an inner peripheral surface of the shell 101. In detail, the reinforcing member 290 includes a first coupling part 291 that is coupled to the discharge side support member 280, and a second coupling part 295 that is bent from the first coupling part 291 and is coupled to an inner peripheral surface of the shell 101.

The cover coupling part 270 may be supported by the shell 101 ore the second shell cover 103 through the discharge side support member 280 and the reinforcing member 290. The supported means includes a magnetic member. In detail, the magnetic member includes a first magnetic part that is provided in the cover coupling part 270 and a second magnetic part that is installed in the discharge side support member 280. A repulsive force may be applied between the first and second magnetic parts.

The linear compressor 10 further includes a frame 110. The frame 110 is configured to fix the cylinder 120, and may be coupled to the cylinder 120 by a coupling member. The frame 110 surrounds the cylinder 120. That is, the cylinder 120 may be accommodated inside the frame 110. Further, the discharge cover 200, in particular, the first cover 210 may be coupled to a front surface of the frame 110.

The motor assembly 140 includes an outer stator 141 that is fixed to the frame 110 to surround the cylinder 120, an inner stator 148 that is arranged inside the outer stator 141 to be spaced apart from the outer stator 141, and a permanent magnet 146 that is situated in a space between the outer stator 141 and the inner stator 148.

The permanent magnet 146 may reciprocate due to a mutual electromagnetic force between the outer stator 141 and the inner stator 148. Further, the permanent magnet 146 may include a single magnet having one pole, or a combination of a plurality of magnets having three poles.

The permanent magnet 146 may be coupled to the piston 130 by a connection member 138. In detail, the connection member 138 may be coupled to the piston flange part 132 to extend after being bent towards the permanent magnet 146. As the permanent magnet 146 reciprocates, the piston 130 may axially reciprocate together with the permanent magnet 146.

The outer stator 141 may include a coil winding body and a stator core. The coil winding body includes a bobbin and a coil that is wound in a circumferential direction of the bobbin. A coil may have a polygonal section, and for example, may have a hexagonal shape.

The stator core may be obtained by stacking a plurality of laminations circumferentially, and may surround the coil winding body.

A stator cover 149 is provided on one side of the outer stator 141. That is, one side of the outer stator 141 may be supported by the frame 110, and an opposite side of the outer stator 141 may be supported by the stator cover 149.

The inner stator 148 is fixed to an outer periphery of the frame 110. Further, the inner stator 148 is obtained by circumferentially stacking a plurality of laminations outside the frame 110.

The linear compressor 10 further includes a supporter 137 that supports the piston 130, and a back cover 170 that is spring-coupled to the supporter 137. The supporter 137 is coupled to the piston flange part 132 and the connection member 138 by a coupling member.

The linear compressor 10 further includes a suction guide part 155 that is provided inside a point (a coupling point) of the first shell cover 102 to which the suction part 104 is coupled. The suction guide part 155 is installed adjacent to an inside of the coupling point to guide the refrigerant suctioned through the suction part 104 such that the refrigerant is introduced into the suction muffler 150.

The linear compressor 10 further includes a plurality of resonance springs 176, of which natural frequencies are adjusted such that the piston 130 resonates.

The plurality of resonance springs 176 includes a first resonance spring that is supported between the supporter 137 and the stator cover 149 and a second resonance spring that is supported between the supporter 137 and the back cover 170.

The linear compressor 10 further includes a suction side resilient member 187 that is coupled to the back cover 170. For example, the suction side resilient member 187 includes a plate spring.

The back cover 240 includes a second cover boss 175 that is coupled to the suction side resilient member 187. For example, the second cover boss 175 may be inserted into the suction side resilient member 187. Further, the suction guide part 155 may be coupled to the suction side resilient member 187.

The linear compressor 10 further includes a suction side support member 180 that supports the suction guide part 155. The suction side support member 180 surrounds at least a portion of the suction guide part 155, and is spaced apart from an outer peripheral surface of the suction guide part 155.

Further, the suction side support member 180 may extend from the suction guide part 155 in opposite radial directions, and may be coupled to the first shell cover 102.

A damping member 185 is installed between the suction side support member 180 and the suction guide part 155. For example, the damping member 185 may include a rubber member. The damping member 185 may prevent vibration that may be generated in a processing of suctioning a refrigerant through the suction part 104, from being delivered from the suction guide part 155 to the suction side support member 180. Accordingly, a noise reducing effect is achieved.

Figure 2:
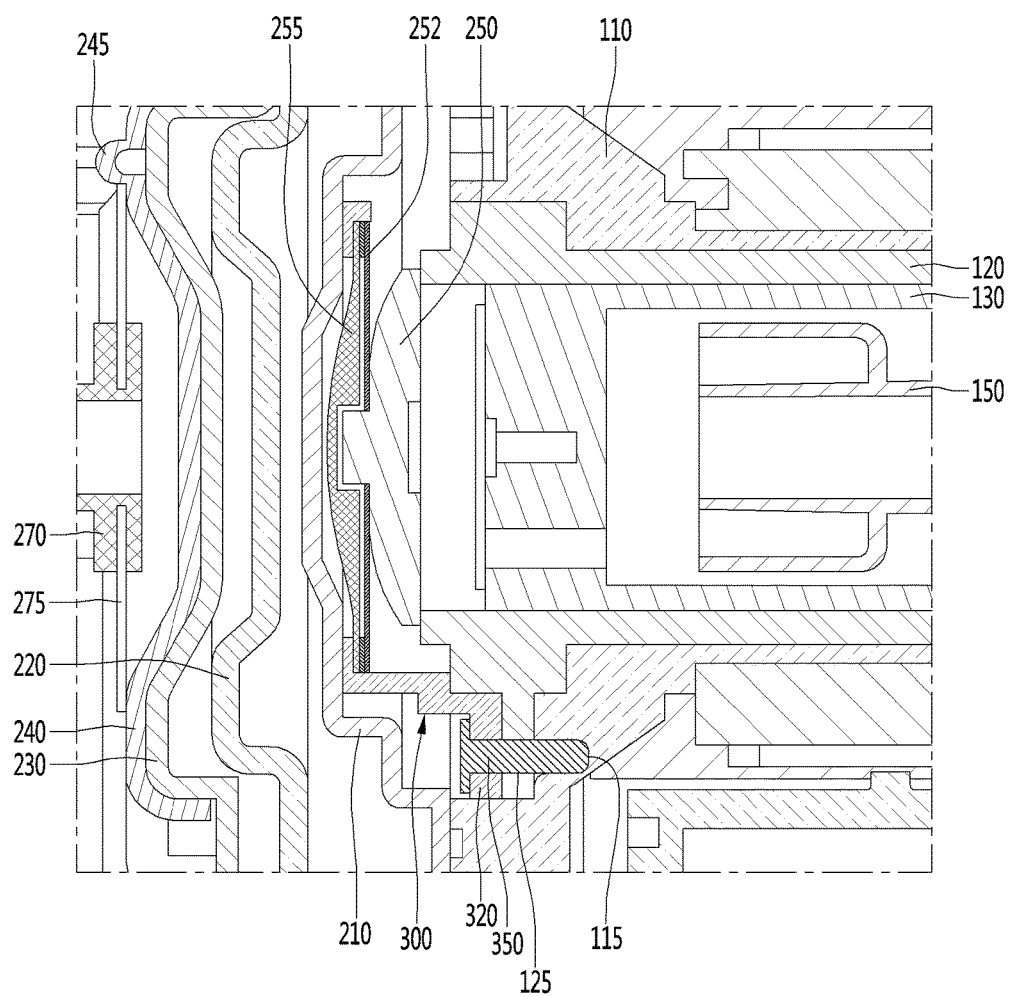
FIG. 2 is a sectional view illustrating a configuration of a discharge cover and a discharge valve assembly according to a first embodiment of the present disclosure.
Figure 3:
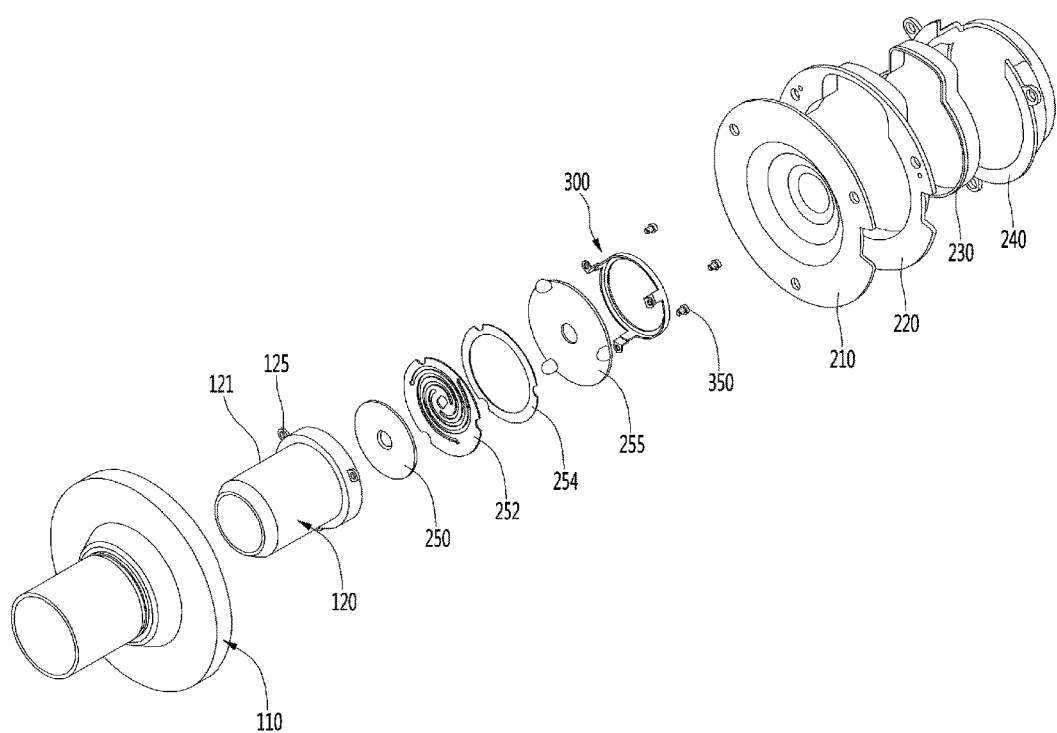
FIG. 3 is an exploded perspective view illustrating a configuration of the discharge cover and the discharge valve assembly according to the first embodiment of the present disclosure.
Figure 4:
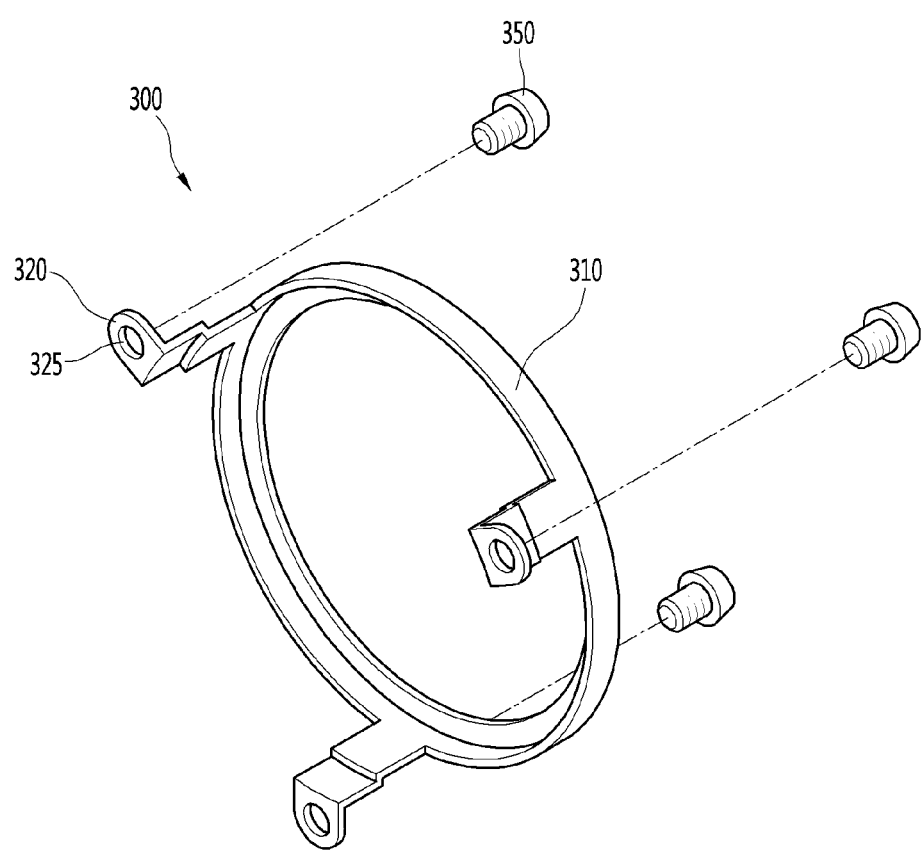
FIG. 4 is a view illustrating a configuration of a valve support device according to the first embodiment of the present disclosure.

FIG. 2 is a sectional view illustrating a configuration of a discharge cover and a discharge valve assembly according to a first embodiment of the present disclosure. FIG. 3 is an exploded perspective view illustrating a configuration of the discharge cover and the discharge valve assembly according to the first embodiment of the present disclosure. FIG. 4 is a view illustrating a configuration of a valve support device according to the first embodiment of the present disclosure.

Referring to FIGS. 2 to 4, the discharge valve assembly according to the first embodiment of the present disclosure includes a discharge valve 250 that is seated on a front surface of the cylinder 120 to be selectively opened, and a valve spring that is coupled to the discharge valve 250 to provide an axial resilient force.

The discharge valve assembly further includes a stopper 255 that is provided in front of the valve spring 252 to restrict a deformation of the valve spring 252. When the discharge valve 250 is opened, the valve spring 252 is deformed forwards, and in this process, the stopper 255 is interfered by the valve spring 252 in front of the valve spring 252 and prevents an excessive deformation of the valve spring 252.

A valve avoidance recess in which at least a portion of the discharge valve 250 may be situated when the discharge valve 250 is moved may be formed on a rear surface of the stopper 255.

The discharge valve assembly further includes a spacer 254 that is installed between the valve spring 252 and the stopper 255. The spacer spaces the valve spring 252 and the stopper 255 apart from each other by a preset distance to secure a space in which the valve spring 252 may be deformed.

The discharge valve assembly further includes a valve support device 300 that is provided on one side of the stopper 255 to stably support the discharge valve 250 and the valve spring 252.

In detail, the valve support device 300 includes a support body 310 that has a substantially ring shape and is situated in front of the stopper 255, and a cylinder support part 320 that extends rearwards from an outer peripheral surface of the support body 310.

The support body 310 includes a support surface that supports a front surface of the stopper 255.

A plurality of cylinder support parts 320 may be provided. The plurality of cylinder support parts 320 may be installed on an outer peripheral surface of the support body 310 to be spaced apart from each other, and may extend rearwards to be coupled to the cylinder 120 and the frame 110. In an aspect that the cylinder support part 320 extends rearwards from the support body 310 to be seated on the cylinder, the cylinder support part 320 may be titled a cylinder leg.

The cylinder support part 320 includes a first coupling part 325 to which a coupling member 350 is coupled. At least a portion of the cylinder support part 320 may pass through the first coupling part 325. The coupling member 350 may pass through the first coupling part 325 to be coupled to the cylinder 120 and the frame 110.

The cylinder 120 includes a second coupling part 125 to which the coupling member 350 is coupled. The second coupling part 125 protrudes radially from an outer peripheral surface of a front part of the cylinder body 121 into which the piston 130 is inserted. Further, a through-hole, into which the coupling member 350 may be inserted, is formed in the second coupling part 125.

The frame 110 includes a third coupling part 115 to which the coupling member 350 is coupled. The third coupling part 115 may be formed by recessing one surface of a front part of the frame 110 rearwards.

The coupling member 350 may pass through the first coupling part 325 and the second coupling part 125 to be coupled to the third coupling part 115. That is, because the valve support device 300, the cylinder 120, and the frame 110 may be coupled to each other through one coupling member 350, a simple assembly structure may be achieved.

According to the configuration, because the valve support device 300 may be coupled to the cylinder 120 and the frame 110 while supporting the discharge valve 250, the valve spring 252, and the stopper 255, it may prevent vibration of the discharge valve 250 or the valve spring 252 generated in a process of discharging the refrigerant from being delivered to the discharge cover 200 while the vibration is delivered to the frame 110.

If the vibration is delivered to the discharge cover 200, the vibration may be delivered to the shell 101 or the shell covers 102 and 103 through the discharge side support member 310 and the reinforcing member 320.

However, according to the present embodiment, because the vibration is delivered to the frame 110 and the frame 110 has a relatively large mass as compared with the discharge cover 200, the vibration may be damped.

Hereinafter, the second embodiment and the third embodiment of the present disclosure will be described. Because these embodiments are different from the first embodiment only in some configurations, the same configurations as those of the first embodiment will be denoted by the same reference numerals and will not be described in detail.

Figure 5:
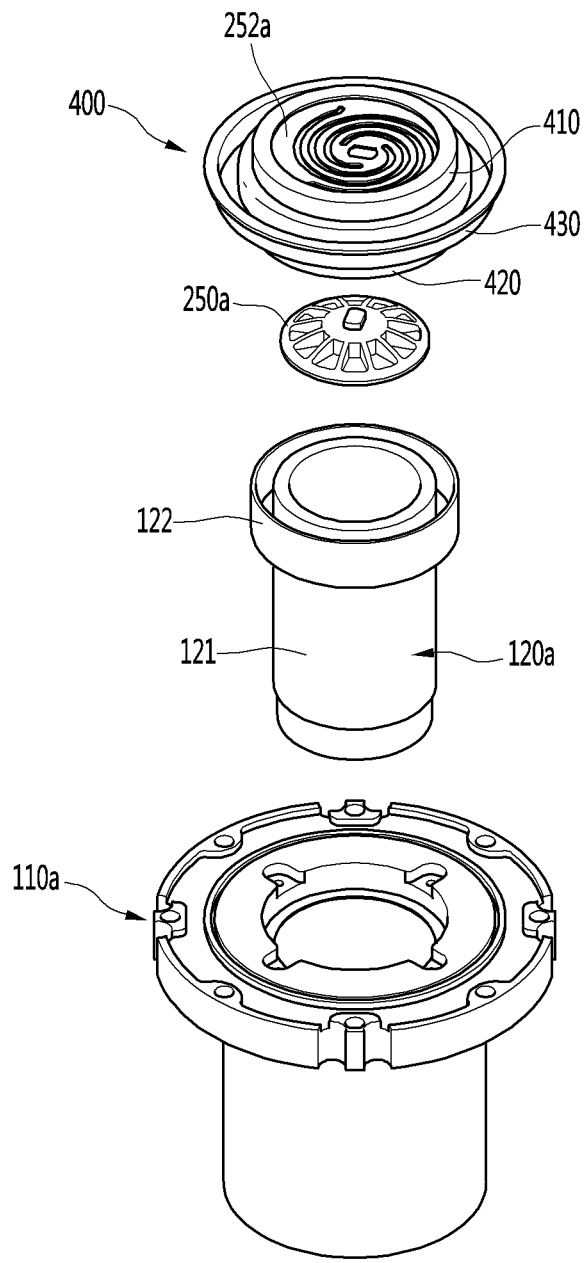
FIG. 5 is an exploded perspective view illustrating a configuration of a piston and a valve support device according to the second embodiment of the present disclosure.
Figure 6:
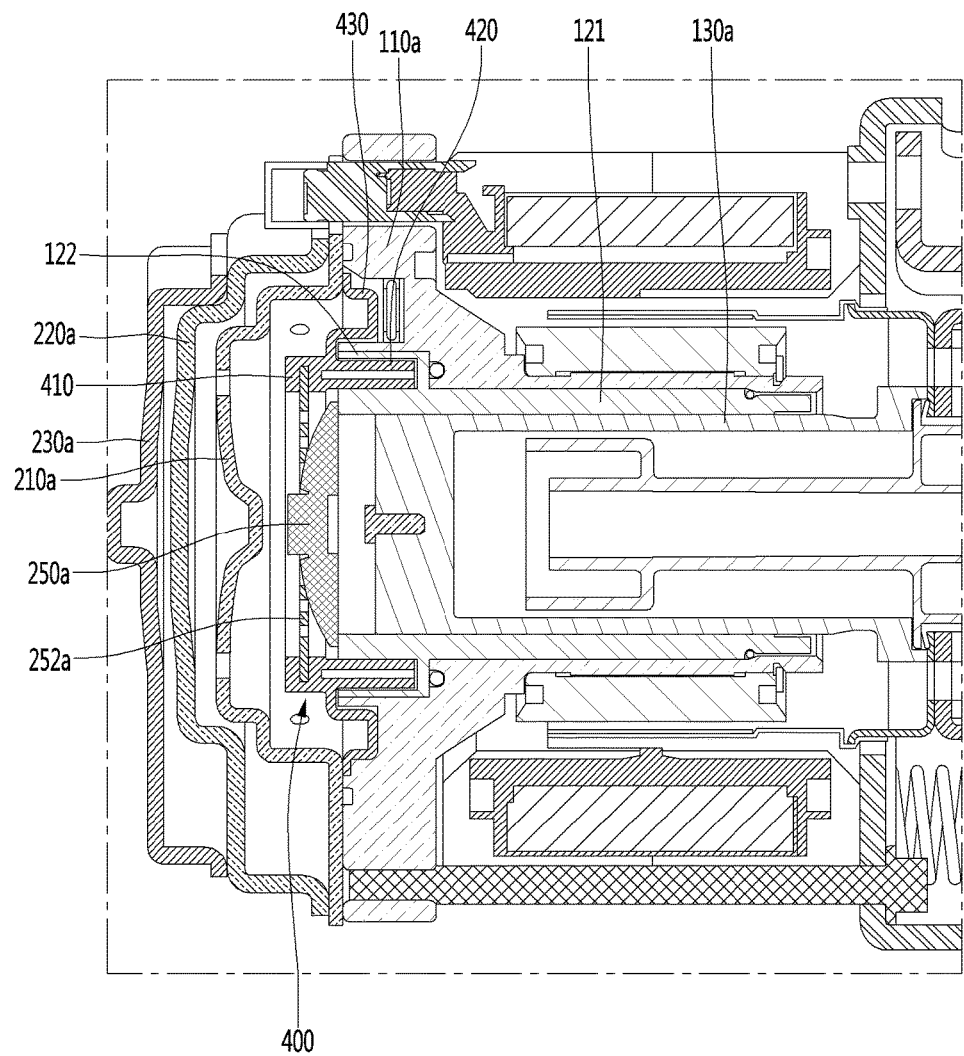
FIG. 6 is a sectional view illustrating a configuration of the linear compressor according to the second embodiment of the present disclosure.
Figure 7:
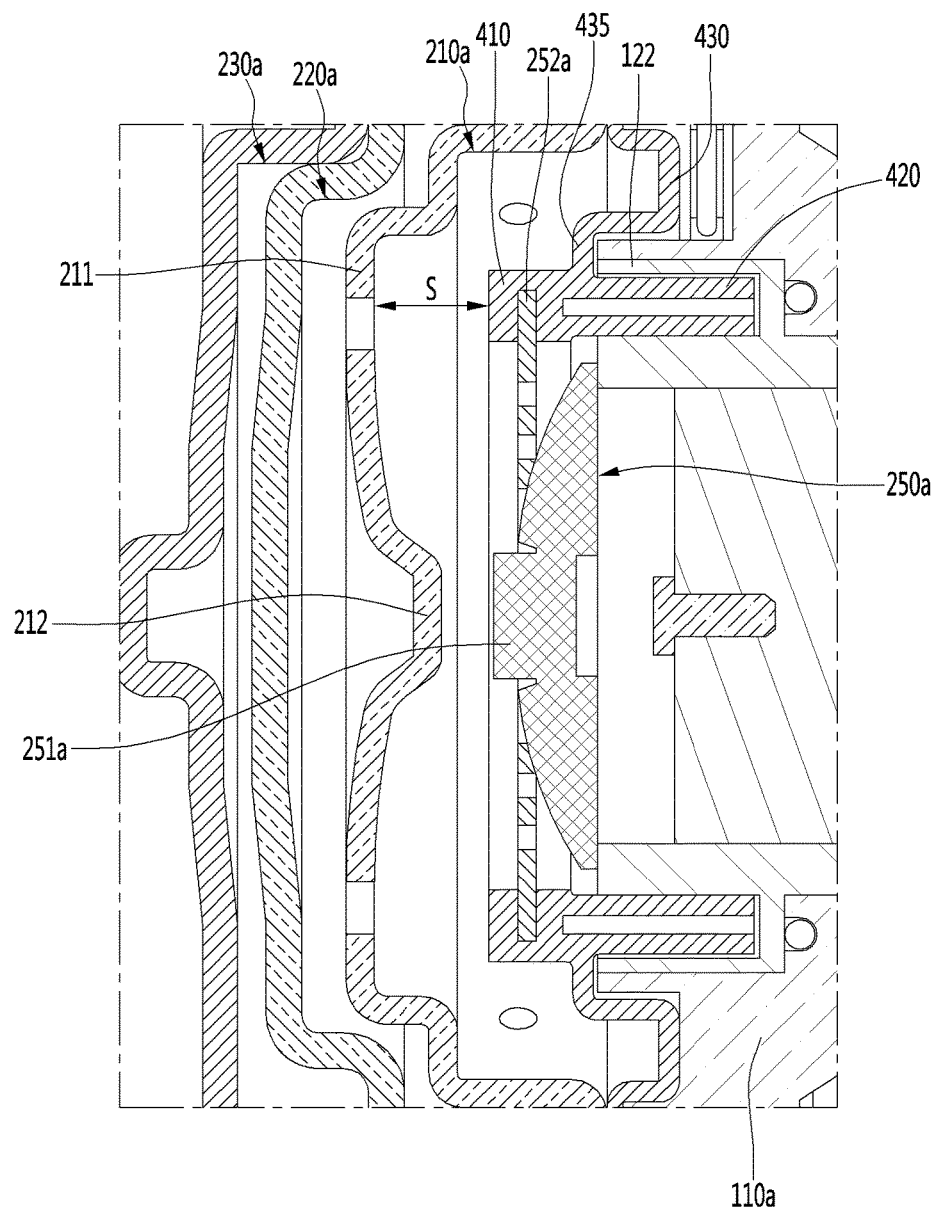
FIG. 7 is a sectional view illustrating a configuration of a discharge cover and a discharge valve assembly according to the second embodiment of the present disclosure.

FIG. 5 is an exploded perspective view illustrating a configuration of a piston and a valve support device according to the second embodiment of the present disclosure. FIG. 6 is a sectional view illustrating a configuration of the linear compressor according to the second embodiment of the present disclosure. FIG. 7 is a sectional view illustrating a configuration of a discharge cover and a discharge valve assembly according to the second embodiment of the present disclosure.

Referring to FIGS. 5 to 7, the linear compressor according to the second embodiment of the present disclosure includes a frame 110a that accommodates a cylinder 120a, and a discharge valve assembly that is provided in front of the cylinder 120a.

The cylinder 120a includes a cylinder body 121a into which the piston 130 is inserted, and a cylinder flange 122 that is provided in front of the cylinder body 121a. A valve support device 400 may be coupled to the cylinder flange 122.

The discharge valve assembly includes a discharge valve 250a that is seated at a front part of the cylinder 120a, and a valve spring 252a that is coupled to a central portion 251a of the discharge valve 250a to provide an axial resilient force to the discharge valve 250a. For example, the valve spring 252a may include a plate spring.

The discharge valve assembly further include a valve support device 400 that is coupled to the valve spring 252a to support the discharge valve 250a and the valve spring 252a.

The valve support device 400 includes a spring coupling part 410 that is coupled to the valve spring 252a, and a cylinder coupling part 420 that extends rearwards from the spring coupling part 410 to be coupled to the cylinder 120a.

The spring coupling part 410 may have a substantially ring shape corresponding to the shape of the valve spring 252a. The valve spring 252a may be situated in an empty interior space of the spring coupling part 410.

The cylinder coupling part 420 may be coupled to a cylinder flange 122 of the cylinder 120a. The cylinder flange 122 may be formed on an outer peripheral surface of a front part of the cylinder 120a and may have a recess that is opened forwards. The cylinder coupling part 420 may be inserted into the opened recess.

The valve support device 400 further includes a frame support part 430 that extends radially from the sprig coupling part 410 to be supported by a front part of the frame 110. The frame support part 430 includes a step 435 that is situated at a front end of the cylinder flange 122. The step 435 may be understood as an insertion stopper that restricts a depth by which the valve cylinder coupling part 420 may be inserted into the cylinder flange 122.

According to the configuration, the valve support device 400 may be stably supported by the cylinder 120 and the frame 110 while supporting the discharge valve 250a and the valve spring 252a.

A discharge cover is installed in front of the discharge valve assembly. A plurality of covers are provided in the discharge cover. The plurality of covers include a first cover 210a, a second cover 220a, and a third cover 230a. The first cover 210a, the second cover 220a, and the third cover 230a may be sequentially arranged from the discharge valve 250a.

That is, the first cover 210a of the plurality of covers is arranged closest to the discharge valve assembly. Further, an inner surface of the first cover 210a, that is, a rear part of the first cover 210a may face the valve spring 252a.

In detail, the first cover 210a includes a cover body 211 that extend radially while facing the valve spring 252a, and a valve stopper 212 that protrudes rearwards from a substantially central portion of the cover body 211.

The cover body 211 is spaced apart from the valve support device 400 by a preset distance S. In detail, the cover body 211 may be spaced apart from the spring coupling part 410 by the preset distance S. For example, the preset distance S may range from 5 mm to 10 mm.

When the cover body 211 and the valve support device 400 are too close to each other, the discharge valve 250a, the valve spring 252a, and the valve support device 400 vibrate due to the pulsations of the refrigerant while the discharge valve 250a is opened and closed, and the vibration may be delivered to the discharge cover while the refrigerant in a space between the cover body 211 and the valve support device 400 is taken as a medium.

As described, the discharge cover has a relatively small mass as compared with the frame 110, and the vibration delivered to the discharge cover may be delivered to the shell 101 or the shell covers 102 and 103 through the discharge side support member 310 and the reinforcing member 320 with a higher possibility.

Accordingly, as in the present embodiment, the vibration generated by the discharge valve assembly may be delivered to the frame 110 by which the valve support device 400 is supported, by spacing the cover body 211 and the valve support device 400 apart from each other so that the vibration may be prevented from being delivered to the discharge cover.

The valve stopper 212 may be formed at a location corresponding to a central portion 251a of the discharge valve 250a to restrain an opening degree of the discharge valve 250a when the discharge valve 250a is opened, that is, the discharge valve 250a is moved forwards. That is, the discharge valve 250a may be restrained from being opened to not less than the opening degree corresponding to the case when the discharge valve 250a contacts the valve stopper 212.

Figure 8:
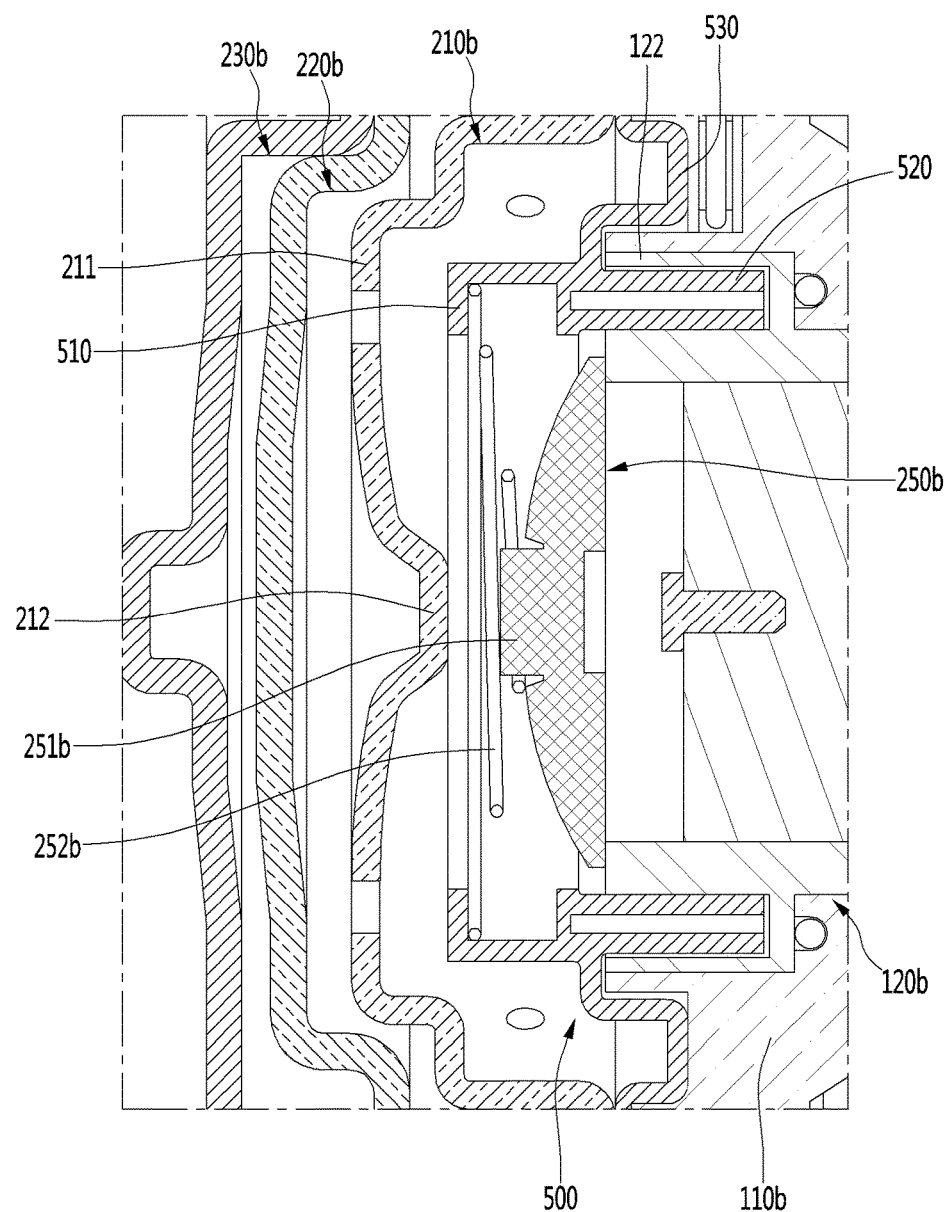
FIG. 8 is a sectional view illustrating a configuration of a discharge cover and a discharge valve assembly according to the third embodiment of the present disclosure.

FIG. 8 is a sectional view illustrating a configuration of a discharge cover and a discharge valve assembly according to the third embodiment of the present disclosure.

Referring to FIG. 8, the linear compressor according to the third embodiment of the present disclosure includes a discharge cover including a plurality of covers and a discharge valve assembly.

The plurality of covers include a first cover 210b, a second cover 220b, and a third cover 230b. The first cover 210b, the second cover 220b, and the third cover 230b may be sequentially arranged from the discharge valve 250b.

The present embodiment is different from the second embodiment in that the valve spring is a coil spring.

In detail, the discharge valve assembly includes a discharge valve 250b that has a central portion 251b, a valve spring 252b that is coupled to the central portion 251b to provide an axial resilient force to the discharge valve 250b, and a valve support device 500 that supports the discharge valve 250b and the valve spring 252b.

The valve support device 500 includes a spring coupling part 510 that is coupled to the valve spring 252b, a cylinder coupling part 520 that extends rearwards from the spring coupling part 510 to be inserted into the the cylinder flange 122 of the cylinder 120b, and a frame support part 530 that extends radially from the spring coupling part 510 to be supported by a front part of the frame 110b.

The spring coupling part 510 may be configured such that an end of the valve spring 252b is seated on the spring coupling part 510. The valve spring 252b may include a plate spring.

A first end of the valve spring 252b may be coupled to a central portion 251b of the discharge valve 250b, and a second end of the valve spring 252b may be supported by or coupled to the spring coupling part 510.

The valve support device 500 may be stably supported by the cylinder 120 and the frame 110 while supporting the discharge valve 250b and the valve spring 252b. Further, the valve support device 500 may damp the vibration generated by the discharge valve assembly by delivering the vibration to the frame 110.

Further, manufacturing costs of the compressor may be reduced and the operational reliability of the spring may be improved because the valve spring 252b is a coil spring.

According to the present disclosure, because vibration generated by the discharge valve may be delivered to the shell through a frame having a relatively large mass by the valve support device, vibration and noise of the shell may be reduced.

In detail, the cylinder support part of the valve support device is coupled to the cylinder and the frame by one coupling member, the vibration generated by the discharge valve may be easily delivered to the frame through a coupling area.

Further, because a plurality of cylinder support parts are provided, the valve support devices may be firmly supported by the cylinder and the frame, and accordingly, may prevent delivery of vibration.

Further, because the valve support device may be stably supported by the cylinder and the frame through the spring coupling part, the cylinder coupling part, and the frame support part, delivery of vibration may be prevented.

Further, because the valve support device may be spaced apart from the discharge cover, an interference between the valve support device and the discharge cover may be prevented while the discharge valve is opened and closed, and accordingly, the vibration delivered from the discharge valve to the valve support device may be delivered not to the discharge cover but to the frame.

Further, the valve spring may include a plate spring or a coil spring, and the plate spring or the coil spring may be stably supported by the valve support device.

What is claimed is:
1. A linear compressor comprising:
 a cylinder that provides a compression space for a refrigerant, the cylinder having a first coupling part;
 a frame that fixes the cylinder to an interior of a shell, the frame having a second coupling part;
 a piston that reciprocates axially and is disposed inside the cylinder;
 a discharge valve that is disposed at a side of the cylinder to selectively discharge the refrigerant compressed in the compression space;
 a discharge cover that is coupled to the frame, the discharge cover having a discharge space to receive the refrigerant discharged through the discharge valve;
 a valve spring that provides an axial resilient force to the discharge valve;
 a stopper that is disposed at a side of the valve spring, the stopper having a valve avoidance recess in which at least a portion of the discharge valve is disposed when the discharge valve is moved;
 a spacer that is disposed between the valve spring and the stopper; and
 a valve support device to transfer vibration generated by the discharge valve to the frame, the valve support device being coupled to the valve spring and supported by the frame,
 wherein the valve support device comprises:
  a support body that is supported by the discharge cover and has a ring shape, the support body being at a side of the stopper and having a support surface that supports the stopper; and
  a cylinder support part that extends from an outer peripheral surface of the support body and is coupled to the cylinder and the frame, the cylinder support part having a third coupling part in which a coupling member is received,
 wherein the coupling member passes through the third coupling part and the first coupling part and is coupled to the second coupling part.

2. The linear compressor of claim 1, wherein the cylinder support part extends axially from an outer peripheral surface of the support body and is supported by a surface of the cylinder.

3. The linear compressor of claim 2, wherein:
 the cylinder support part comprises a plurality of cylinder support parts, and
 the plurality of cylinder support parts are arranged at an outer peripheral surface of the support body and spaced apart from each other.

4. The linear compressor of claim 1, wherein the valve spring comprises a plate spring.

5. The linear compressor of claim 1, further comprising:
 a cover coupling part that is coupled to the discharge cover; and
 a discharge side support member that extends towards the shell and supports the cover coupling part.

6. The linear compressor of claim 1, wherein the second coupling part protrudes radially from an outer peripheral surface of the cylinder.

7. The linear compressor of claim 1, wherein the third coupling part is formed from a recessed portion of the frame.

8. The linear compressor of claim 1, wherein the discharge valve is coupled to the valve spring, and a surface of the discharge valve is supported by the cylinder.

9. The linear compressor of claim 1, wherein the support body is seated on an inner surface of the discharge cover.

10. The linear compressor of claim 1, wherein the discharge cover comprises a plurality of covers.

11. The linear compressor of claim 10, wherein the plurality of covers are sequentially arranged from the discharge valve.

12. The linear compressor of claim 10, wherein the support body is seated on an inner surface of a first cover of the plurality of covers.

* * * * *